United States Patent Office 3,534,066
Patented Oct. 13, 1970

3,534,066
PERHALO CONTAINING AIR-DRYING MONOMERS
Robert A. Braun, Newark, Del., assignor to E. I. du Pont de Nemours and Company, Wilmington, Del., a corporation of Delaware
No Drawing. Original application July 25, 1963, Ser. No. 297,677, now Patent No. 3,340,275, dated Sept. 5, 1967. Divided and this application May 26, 1967, Ser. No. 641,506
Int. Cl. C07d 7/10
U.S. Cl. 260—345.8                1 Claim

ABSTRACT OF THE DISCLOSURE

Compounds represented by the formula

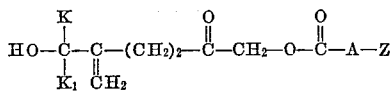

where

A is —CH=CH—

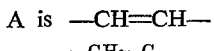

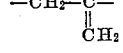

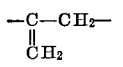

or

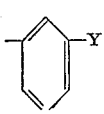

or

Z is 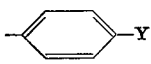

or

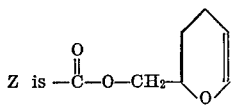

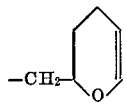

and K and $K_1$ are perchloroalkyl, perfluoroalkyl or perchloro-perfluoroalkyl; and a process for their preparation.

CROSS-REFERENCES TO RELATED APPLICATIONS

This application is a divisional of copending application Ser. No. 297,677, filed July 25, 1963 and now U.S. Pat. No. 3,340,275.

SUMMARY OF THE INVENTION

This invention relates to new air-drying fluorine-containing compounds. It is more particularly directed to compounds represented by the structure (1) 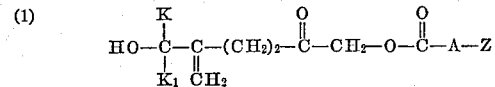

where

A is —CH=CH—

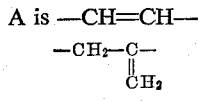

and

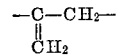

Z is 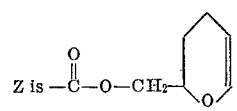

or

and K and $K_1$ are perchloroalkyl, perfluoroalkyl or perchloro-perfluoroalkyl radicals, all containing 1 through 5 carbon atoms.

Illustrative of the perchloro-fluoro radicals in the K and $K_1$ positions are —$CF_3$, —$CF_2Cl$, —$CCl_2F$, —$C_2F_5$, —$C_3F_7$, —$C_5F_{11}$, $C_4F_9$ and —$CF_2$—$CF_2Cl$.

The compounds of Formula 1 polymerize in the presence of siccative metal compounds and oxygen to form insoluble, tough, durable coatings. The compounds are therefore useful as film-formers in coating compositions.

The presence of fluorine atoms in the compounds gives the resulting finishes superior durability and resistance to steam, water and solvents. This makes them suitable for use in formulating metal protective primers, aerosol enamels, automotive refinish enamels, decorative coatings for tin plate and exterior and interior housepaints.

The compounds are liquids and so require no solvents in their formulation. Thus, coating compositions containing 100% of film-former are feasible.

Preferred for this use is:

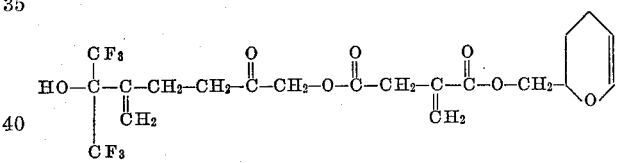

The compounds of the invention can be prepared according to the equation (2) 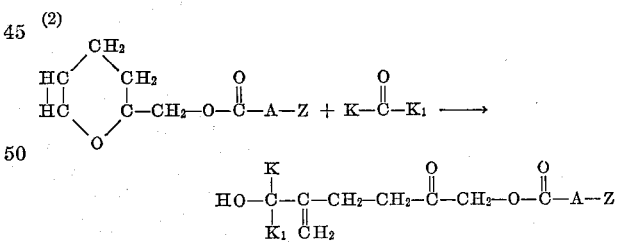

In this equation, A, Z, K and $K_1$ are defined as in Formula 1.

Certain of the starting material used in the method of Equation 2 can be made by the reaction of dihydropyran-2-methanol with polyfunctional acids. This is described in detail in copending U.S. application Ser. No. 99,047, filed Mar. 29, 1961 and now abandoned. The others are commercially available.

The lower perhaloketone reactants are available commercially. The higher ketones can be made by methods described in M. Haupschein and R. A. Braun, J.A.C.S., 77, 4930 (1955).

The reaction of Equation 2 is carried out by mixing exactly equimolar quantities of the reactants and then placing them in a bomb with about an equal volume of a hydrocarbon solvent such as benzene or hexane.

The bomb is then heated to a temperature of from 100–175° C., preferably at 125–150° C. This temperature is maintained for from 1 to 12 hours. In most instances, the reaction will be substantially complete in about five hours. Completion can be determined by observing a decrease in pressure during the reaction.

Generally, from 0.1 to 1% of a free radical inhibitor such as hydroquinone is used to prevent polymerization during heating.

The compounds are isolated by removing the solvent and traces of unreacted ketone under vacuum. The liquid essentially pure product is left behind. This can be used directly in the preparation of coating compositions.

Coating compositions can be prepared using the compounds of this invention by simply mixing them with the usual amount of a conventional siccative metal drier such as cobalt butyl phthalate. This gives clear, unpigmented finishes. If desired, conventional pigments, in the usual amounts, can be added to these coating compositions by the usual blending and grinding techniques of sand-grinding, ball-milling, or the like.

The coating compositions can also be used together with other liquid air-drying coating compositions to give various modifying effects.

The compositions can be applied by brushing, dipping or spraying, and require no special processing or equipment. If thinning is required, the compositions can be diluted with conventional paint thinners such as esters or ketones.

DESCRIPTION OF THE PREFERRED EMBODIMENTS

The following are placed into a stainless steel bomb:

| | Parts |
|---|---|
| Itaconic acid diester of dihydropyran-2-methanol | 64.2 |
| Benzene | 100.0 |
| Hexafluoroacetone | 34.0 |

The bomb is heated at 150° C. for 4 hours. The mixture is then cooled and the solvent removed under vacuum to give 114 parts of a clear, orange viscous liquid having the structure

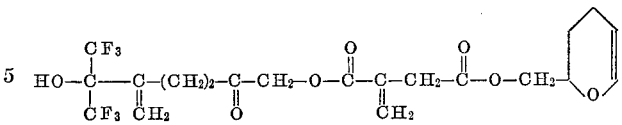

Ten parts of this compound are mixed with 0.05 part of cobalt (as cobalt butyl phthalate) applied to a redwood panel. The film dries to a clear, tack-free coating after twenty-four hours at room temperature, or after about one hour of baking at 50° C.

The reactants in the following list can be used in place of the hexafluoroacetone and the itaconic acid diester of dihydropyran-2-methanol, in the same proportions, to give corresponding compounds of the invention:

Perfluorobutan-2-one
Perfluoropentan-3-one
Chloropentafluoroacetone
1,1,2,2-tetrachlorodifluoroacetone
Fumaric acid diester of dihydropyran-2-methanol
o-Phthalic acid diester of dihydropyran-2-methanol
Sebacic diester of dihydropyran-2-methanol
Dihydropyran-2-carboxylic acid ester of 2-dihydropyran-2-methanol.

I claim:
1. A compound of the formula

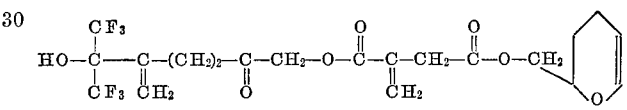

No references cited.

NORMA S. MILESTONE, Primary Examiner

U.S. Cl. X.R.

106—287, 299, 310